Sept. 2, 1947.   D. E. WOOLDRIDGE   2,426,658
RADAR TRACKING DEVICE
Filed Aug. 19, 1943   6 Sheets-Sheet 1

INVENTOR
D. E. WOOLDRIDGE
BY
ATTORNEY

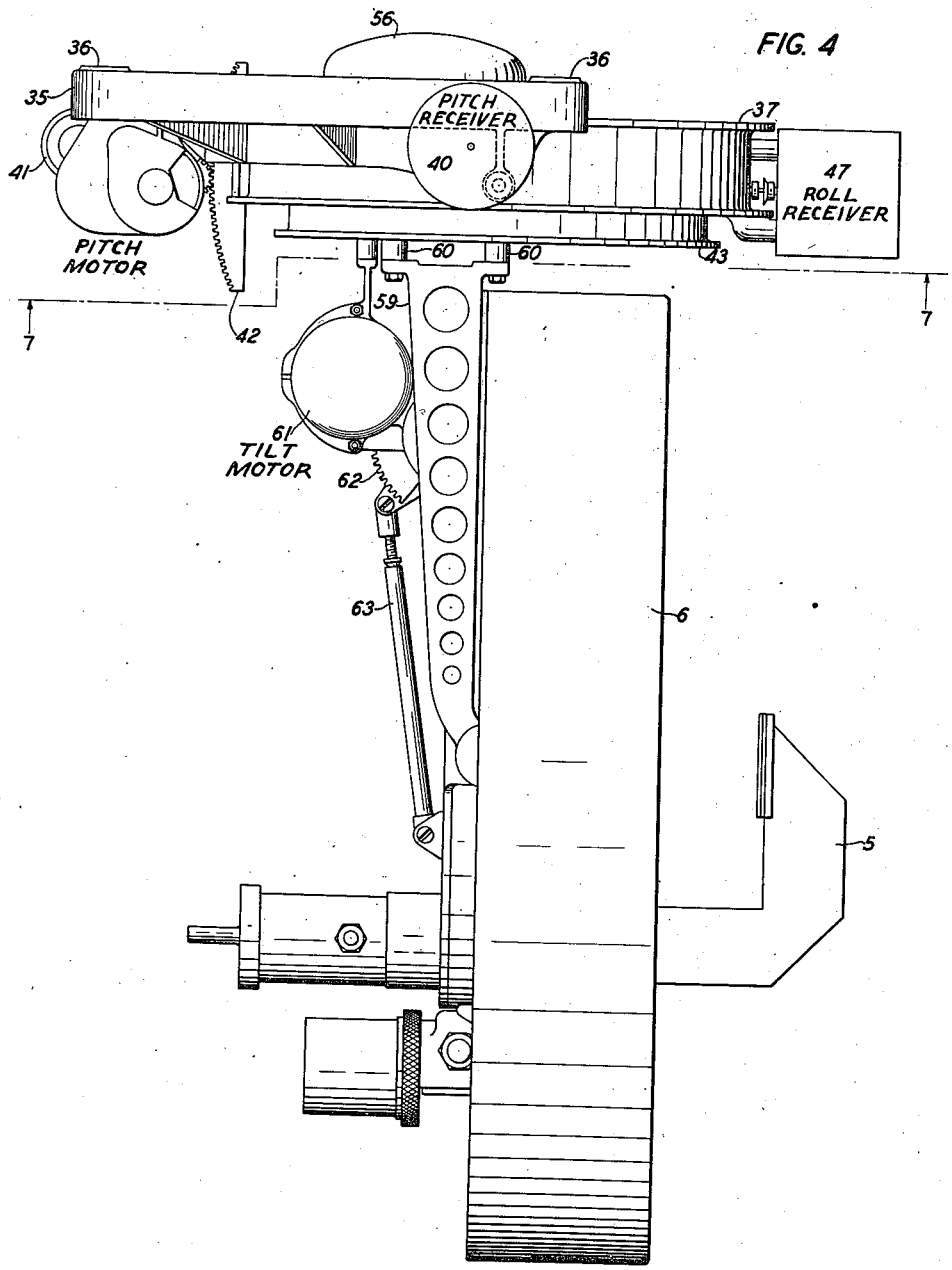

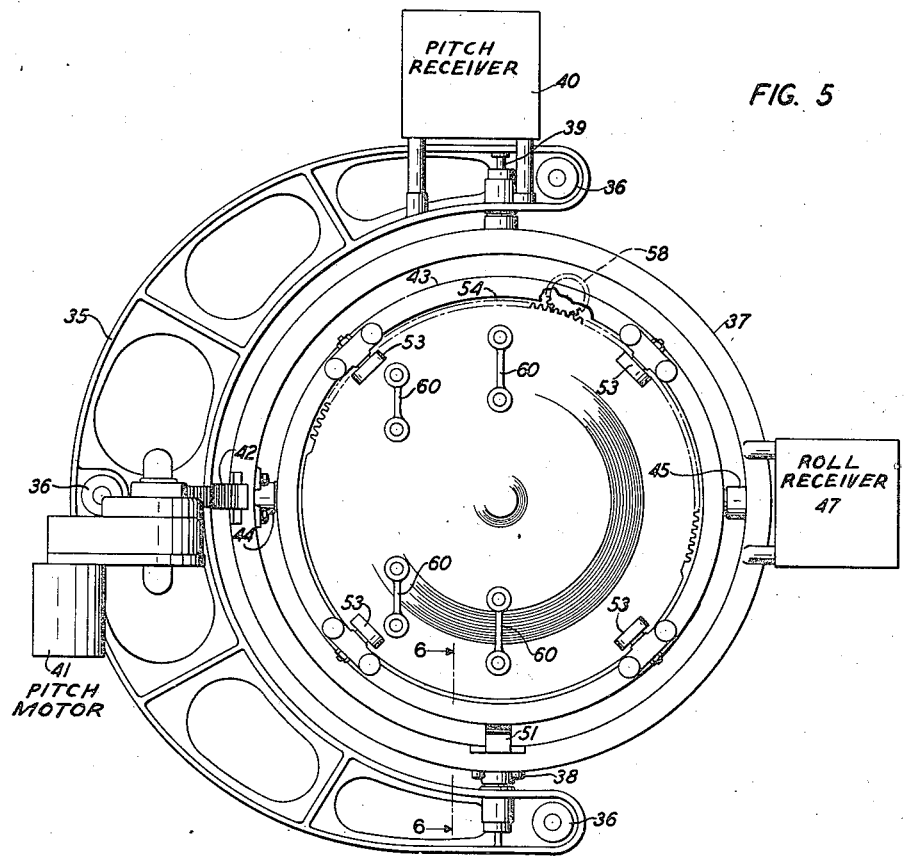

INVENTOR
D. E. WOOLDRIDGE
BY

ATTORNEY

Sept. 2, 1947.  D. E. WOOLDRIDGE  2,426,658
RADAR TRACKING DEVICE
Filed Aug. 19, 1943  6 Sheets-Sheet 5

INVENTOR
D. E. WOOLDRIDGE
BY
ATTORNEY

Sept. 2, 1947.                D. E. WOOLDRIDGE                 2,426,658
                              RADAR TRACKING DEVICE
                        Filed Aug. 19, 1943          6 Sheets-Sheet 6
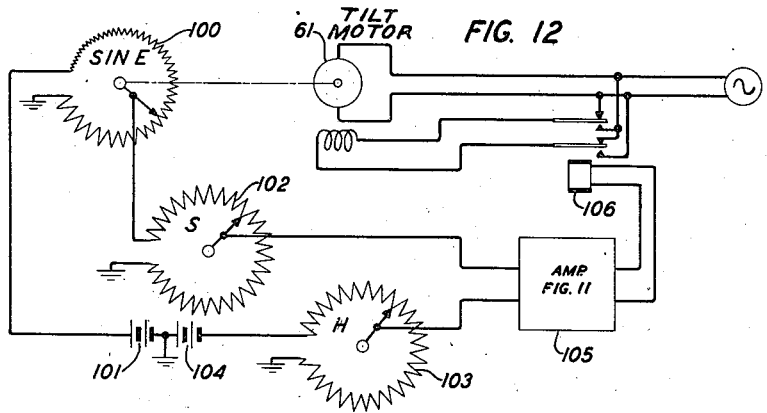
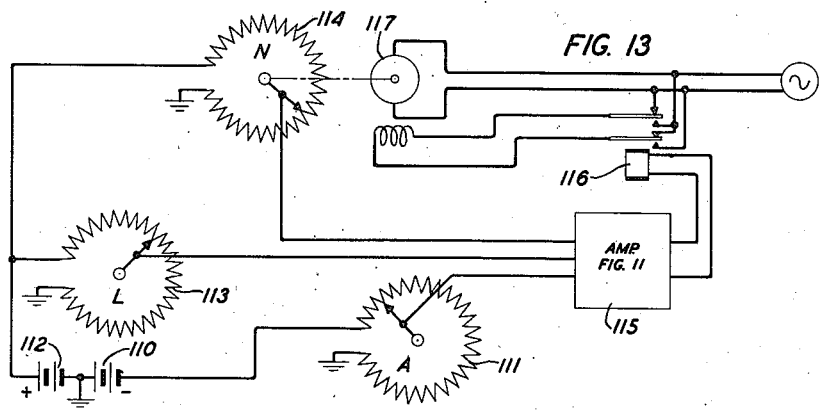
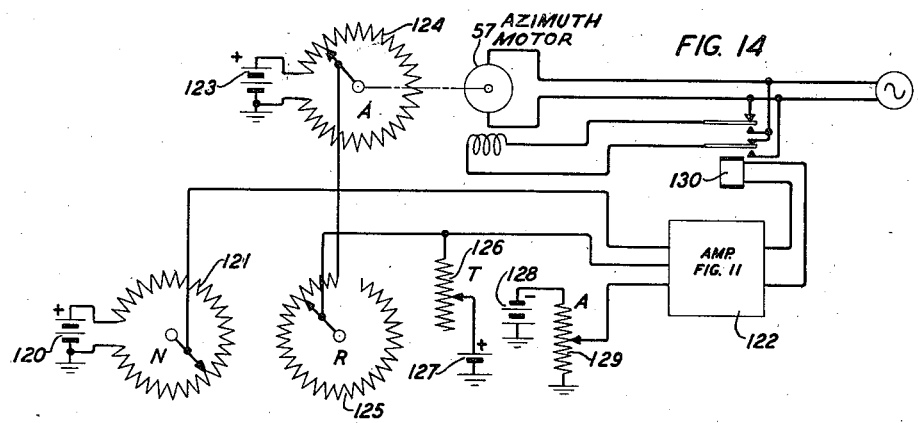
INVENTOR
D. E. WOOLDRIDGE
BY
    ATTORNEY Patented Sept. 2, 1947

2,426,658

UNITED STATES PATENT OFFICE 2,426,658

RADAR TRACKING DEVICE

Dean E. Wooldridge, Chatham, N. J., assignor to Bell Telephone Laboratories, Incorporated, New York, N. Y., a corporation of New York Application August 19, 1943, Serial No. 499,188

6 Claims. (Cl. 250—1.62)

This invention relates to a method and means for controlling an element responsive to radiated energy.

The object of the invention is to stabilize the element against random movements of the supporting structure, and to control the element so that the element is directed to a desired point.

A feature of the invention is a means for controlling the movement of the element in a horizontal plane in accordance with electrically computed values.

In many distance measuring and object locating systems, it is necessary to direct the energy radiated by some element to some desired point. The energy may be radiated in the form of electromagnetic waves, such as radio, light or heat waves, or of mechanical waves, such as sound waves in air or water. The radiating element may be in the form of an antenna, or a reflector of electromagnetic waves, or a transmitter of mechanical waves, such as a microphone, transceiver or low frequency oscillator. The waves may be transmitted by the element and the wave reflected from the desired point received on the same, or another element, or the waves may be radiated from the desired point and received on the element. The element may be mounted on a moving body, such as a marine vessel or aerial vehicle which is subject to random movements.

In accordance with the invention the element is supported by a structure stabilized against random movements of the moving vehicle, such as the pitch and roll of a marine vessel or aerial vehicle. The received energy is of such character that the distance from the element to the desired point may be determined. From this determination, electric currents are produced which control motors tilting the element in the vertical plane and rotating the element in the horizontal plane to cause the element to face the desired point. The invention is disclosed embodied in a system for controlling a radio antenna by waves reflected back from the desired point, but the invention is not limited to this specific use and may readily be adapted to many other similar systems.

Figure 3:
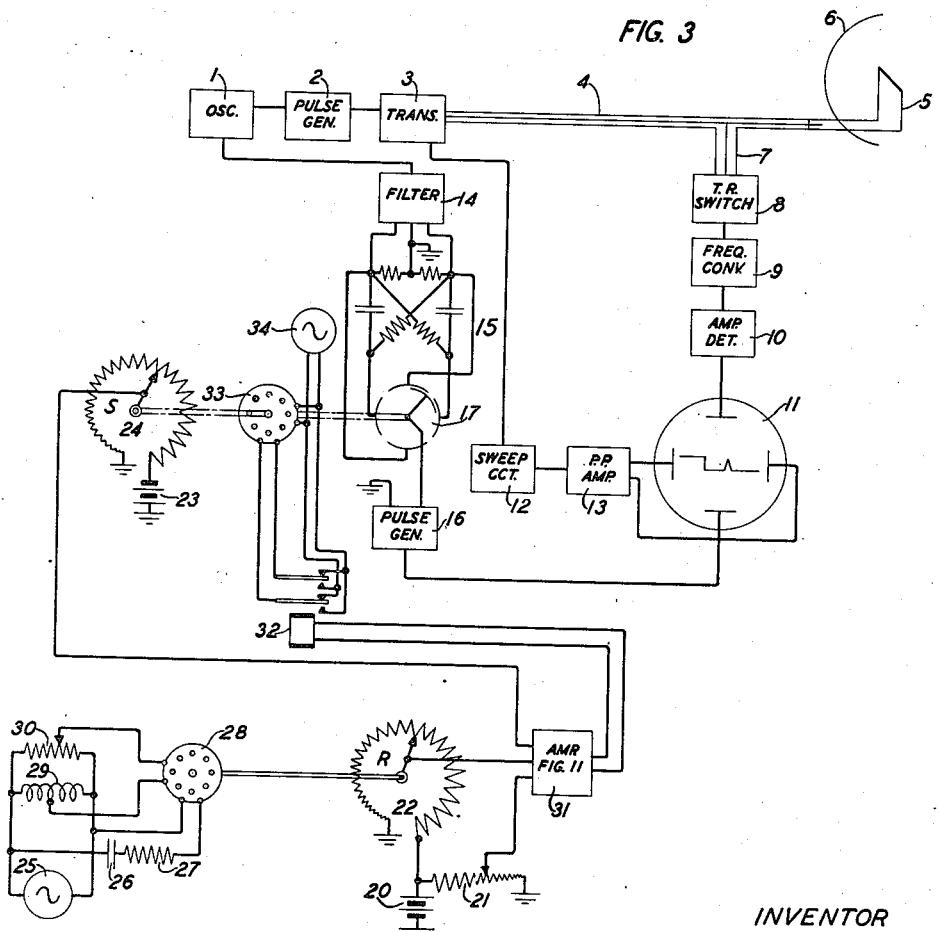
Figure 7:
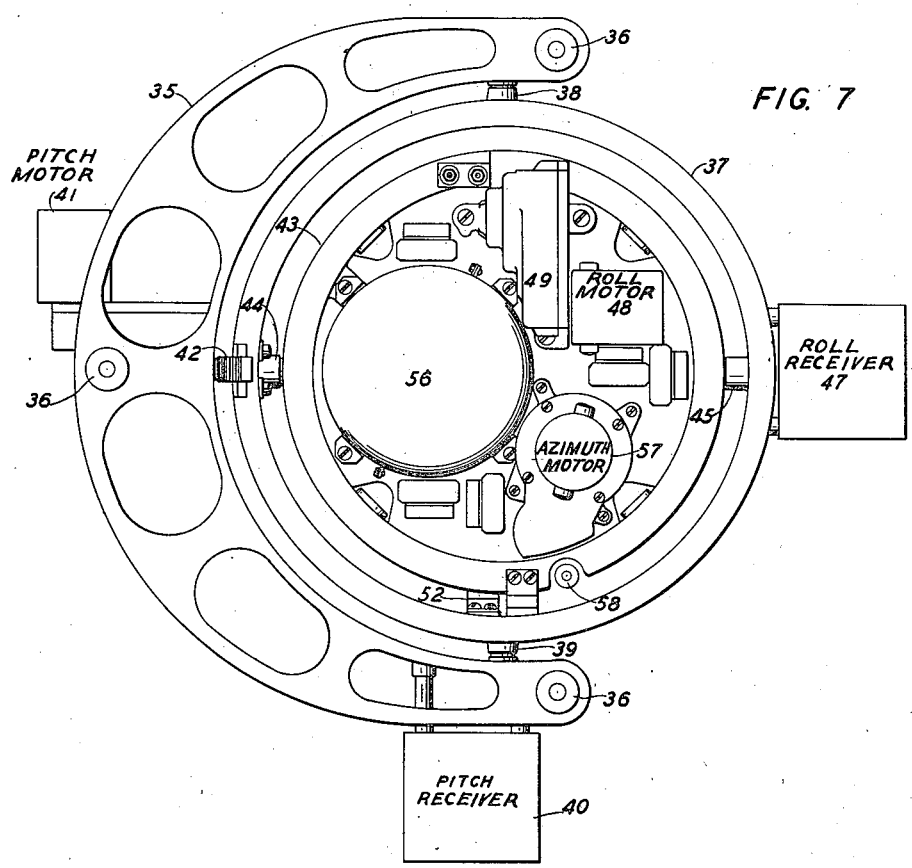
Figure 8:
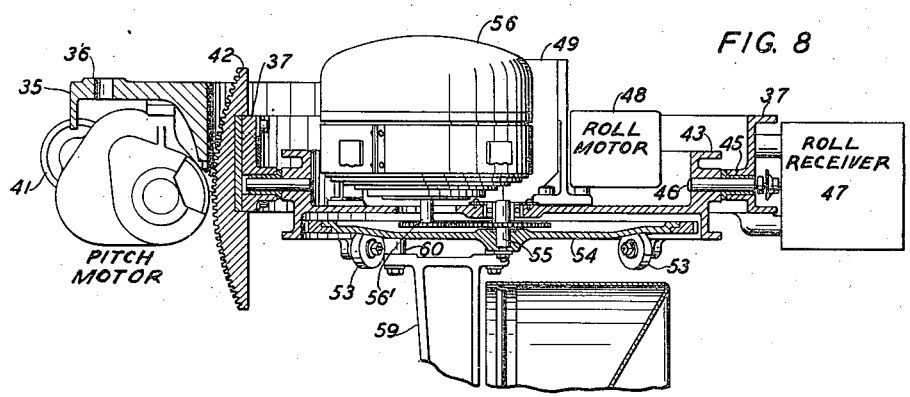
Figure 9:
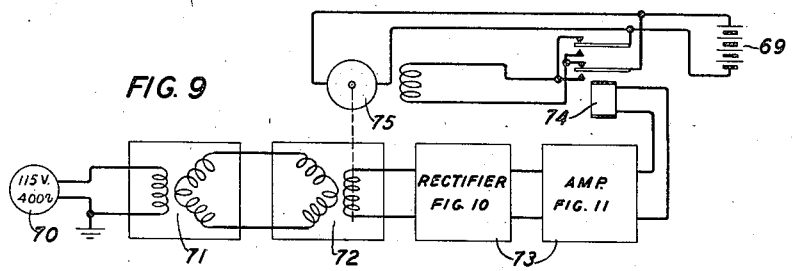
Figure 10:
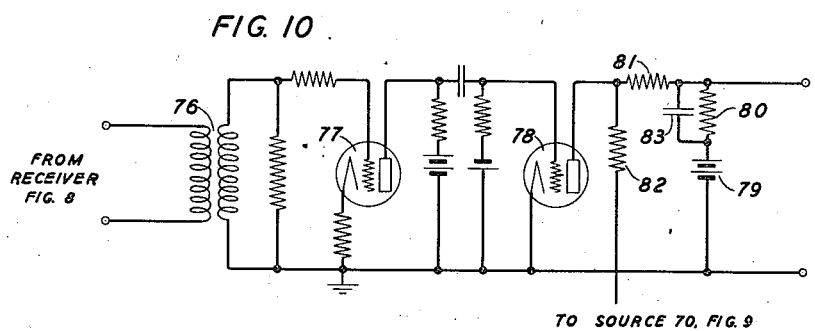
Figure 11:
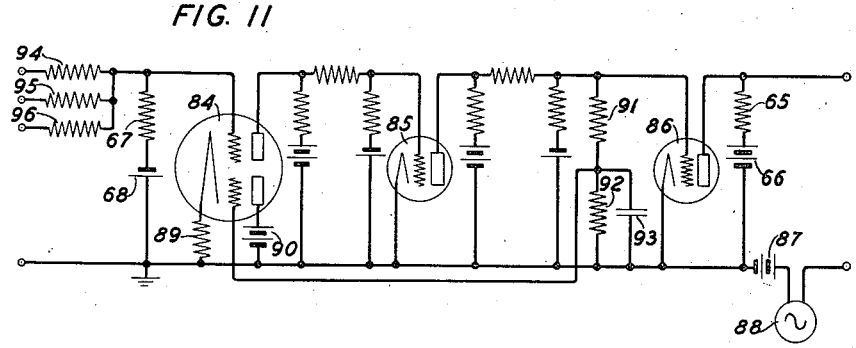

Fig. 3 diagrammatically shows a typical radio system;

Fig. 4 shows a side elevation of the antenna and support;

Fig. 5 shows a view in part section along line 7—7 of Fig. 4;

Fig. 6 shows a detail in part section of the roll drive;

Fig. 7 shows a top view of the support;

Fig. 8 shows a partial sectional view of the support;

Fig. 9 diagrammatically shows a directional gyroscopic control;

Fig. 10 schematically shows the directional rectifier used in Fig. 9;

Fig. 11 shows a summing amplifier for controlling motor relays;

Fig. 12 diagrammatically shows the tilt control motor circuit;

Fig. 13 diagrammatically shows a circuit for indicating the angle (A—L); and

Fig. 14 diagrammatically shows the azimuth angle control circuit.

For convenience of description, the invention will be described in connection with a system for directing a bomb to fall from an airplane upon a target, but the invention is not limited to this specific use.

Figure 1:
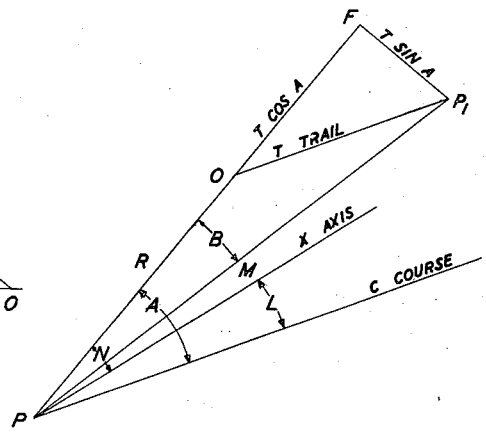
Fig. 1 shows the geometry relating to the azimuthal angle.

In Fig. 1 the various quantities are shown projected on the horizontal plane containing the airplane, which, at a given instant, is at the point P and is flying at constant speed and elevation, heading along the course PC. If a wind be blowing, the airplane will be blown off the course, and will actually fly along some track, such as PP1. If the airplane releases a bomb at the proper instant and continues flying at the same speed along the track, the airplane will reach the point P1 at the instant of impact of the bomb upon the target whose projection is O. The line OP1 will be in the direction of the course PC, and the distance OP1 will equal the "trail" T which is given in the tables for the particular bomb. The projection PO of the slant distance S from the airplane to the target is commonly known as the horizontal range R. The slant distance S is continuously measured by a radiation responsive device, such as a radio measuring equipment radiating energy from an antenna.

A gyroscopic device maintains an axis PX having a direction fixed in space, and thus indicates the angle L between this axis and the course PC, which is the head to tail axis of the airplane. The angle A is the azimuth angle between the head to tail axis of the airplane and the horizontal range, and is indicated by the azimuthal rotation of the antenna.

From the angles A and L the angle N may be determined. It will be noted from Fig. 1, that the angle A increases as the airplane approaches the target. The antenna must be controlled to rotate in azimuth with this variation in the angle A.

As the angle N is measured from an axis fixed in direction to the horizontal range, this angle will not be affected by a change in the course, due to the pilot taking evasive action, as much as the angle A may be affected and thus is preferred to the angle A. The angle N is equal to A—L, Fig. 3. diagrammatically shows a radio transmitter and receiver adapted for use with the present invention. The oscillator 1 generates a sinusoidal signal current of high stability and a moderate frequency of the order of several thousand cycles. The current from the oscillator 1 controls the pulse generator 2 which generates one pulse per cycle, of extremely short duration and high amplitude. These pulses are supplied to the transmitter 3, which may be a magnetron oscillator. The oscillator 3 generates extremely short pulses of radiant energy which may conveniently have a frequency of several thousand megacycles.

The interval between successive pulses is sufficiently long to permit the echo, or reflected pulse, to return from any object within the desired maximum range of the system before the next pulse is transmitted. The signal pulse is transmitted from the transmitter 3 by the coaxial conductors 4, and the wave guide 5.

The antenna includes the wave guide 5 and the paraboloidal reflector 6, arranged so the radiated beam may be rotated in azimuth about a vertical axis and tilted downward from the horizontal to be directed at the target.

The echo reflected from the object is received by the antenna and conducted by the wave guide 5 and coaxial conductor 4 to the junction with the coaxial conductor 7. Between pulses, the magnetron transmitter 3 presents a very high impedance to the coaxial cable 4 and absorbs very little of the received energy. Substantially all the received energy is transmitted to the transmit-receive switch 8.

The transmit-receive switch 8 may be of any desired type and may conveniently be a Western Electric Company 709A vacuum tube. This vacuum tube is essentially a resonant cavity filled with an ionizable gas. During reception, with the low voltages of the received energy, the gas is not ionized, the cavity is tuned to resonance and the received energy is conducted to the frequency converter 9. During the transmission of a pulse, the voltages due to the pulse ionize the gas, thus detuning the cavity and preventing the energy of the pulse from reaching the frequency converter 9.

The frequency converter 9 heterodynes the received waves to a convenient intermediate frequency. The intermediate frequency waves are amplified and detected by the amplifier detector 10 and applied to one of the vertical control plates of a cathode ray tube 11. The received waves cause a sharp upward deflection of the trace of the cathode ray beam.

Energy from the transmitter 3 controls the sweep circuit 12, which, through the push-pull amplifier 13 connected to the horizontal plates of the cathode ray tube, sweeps the cathode ray beam across the screen once per pulse.

Current from the oscillator 1 is selected by the filter 14 and supplied through the adjustable phase shifter or delay network 15 to the pulse generator 16. Once per pulse, at a definite point in the cycle of the current from the oscillator 1, the pulse generator 16 produces a voltage which is applied to a vertical plate of the cathode ray tube 11 and causes the trace of the cathode ray beam to be abruptly deflected downward, and retained in the deflected position as the beam moves from left to right.

The phase shifter 15 may be of the type shown in United States Patent 2,147,728, February 21, 1939, W. T. Wintringham, but, as the phase shift is not over 180 degrees, the inductances may be replaced by resistances, as shown in United States Patent 1,926,877, September 12, 1933, W. A. Marrison. By rotating the movable capacitor plate 17, the time phase of the output voltage from the phase shifter 15 is varied with respect to the input voltage, and the break in the cathode ray trace is moved across the screen of the cathode ray tube.

When the break in the cathode ray trace is moved to coincidence with the deflection due to the received echo, the phase shift or delay in the phase shifter 15 is made equal to the transit time of the echo or reflected pulse, and is, therefore, a measure of the slant distance S from the antenna to the reflecting object.

Assuming that the airplane is flying at constant speed and height, the slant distance S from the airplane to the reflecting object will vary rather rapidly, and the rate of change in the slant distance will also vary. When flying at constant speed, the rate of change in the horizontal distance R from the airplane to the object will be more nearly constant. Thus, it is convenient to track the capacitor plate 17 in terms of the rate of change in horizontal range.

The height, H, horizontal distance, R, and slant distance S are the sides of a right triangle, thus $H^2+R^2-S^2$ should equal zero.

A source of voltage 20 is connected across the windings of two potentiometers 21, 22. A second source of voltage 23, of opposite polarity to the source 20, is connected across the winding of the potentiometer 24. The windings of potentiometers 21, 22, 24 may conveniently be in the form of a resistance wire wound smoothly and closely on a thin insulating card, which is supported in a circular arc concentric with the shaft moving the wiper. The width of the cord varies linearly from one end to the other. The wiper of potentiometer 21 is adjusted to select a voltage proportional to $H^2$.

Current from the source 25 is supplied through the phase splitting network formed by the capacitor 26 and resistor 27 to one phase winding of the two-phase motor 28.

Current from the source 25 flows through the center tapped inductor 29 to the other phase winding of the motor 28, thence to the wiper of the potentiometer 30 connected across the source 25. By adjustment of the wiper of potentiometer 30 the speed and direction of rotation of the motor 28 may be controlled. The motor 28 rotates the wiper of the potentiometer 22 to select a voltage approximately proportional to $R^2$.

The voltages selected by the wipers of the potentiometers 21, 22, 24 are supplied to the amplifier 31 of the type shown in Fig. 11. If the sum of the input voltages is not equal to zero, the output voltage of the amplifier 31 operates the motor control relay 32 supplying power from the source 34 and starting the servo-motor 33. The servo-motor 33 rotates the wiper of potentiometer 24 changing the voltage selected by the wiper until the output of the amplifier 31 is reduced to zero and the relay 32 is released, and at the same time rotating the capacitor plate 17 to move the break in the trace on the screen of the cathode ray tube 11. The speed of the motor 28 is adjusted until the break in the trace on the screen of the cathode ray tube coincides with the deflection due to the received wave, thus making the speed of motor 28 proportional to the rate of change in the horizontal distance R, and the displacement of the wiper of potentiometer 22 proportional to the horizontal distance R.

The resistances per unit length of the windings of potentiometers 21, 22, 24 increase linearly from beginning to end of the winding, so that if the displacements of the wipers are respectively proportional to H, R, and S, the voltages selected by the wipers will be proportional to $H^2$, $R^2$, $S^2$.

Other potentiometer windings may be mounted concentrically with the winding of potentiometer 22, the wipers of these potentiometers also being rotated by the motor 28 proportionally to the horizontal distance R.

The reflector 6 and wave guide 5 may conveniently be supported by the structure shown in Figs. 4 to 8.

In order to insure that the antenna is in a known relationship to the horizontal plane through the airplane, the antenna is supported from a stable element which is not affected by the pitching and rolling of the airplane.

The base 35 is suspended from some convenient part of the structure of the airplane by bolts passing through holes drilled through the bosses 36, 36.

The outer ring 37 is supported by stub shafts 38, 38, Fig. 5, journaled in bearings attached to the outer ring 37 and corresponding bearings in the base 35. The shaft 39, as shown in Fig. 5, extends through the bearing in the base 35 and is geared to a synchronous receiver 40, which may be of the type known commercially as a "telegon." The axis of the shafts 38, 39 is preferably normal to the head to tail axis of the airplane.

The pitch control motor 41 is mounted on the base 35 and geared to a pinion engaging the segmental gear 42 attached to the outer ring 37.

The pitch control motor 41 is controlled as explained hereinafter to drive the segmental gear 42 so as to maintain the outer ring 37 horizontal even when the airplane pitches. The resultant movement of the outer ring 37 adjusts the position of the rotor of the receiver 40 with respect to the stator which is attached to the base 35.

The inner ring 43, Fig. 5, is supported by stub shafts journaled in the bearings 44, 45 attached to the outer ring. The bearings 44, 45 are preferably located on the head to tail axis of the airplane. The stub shaft 46 is extended through the outer ring 37 and geared to a receiver 47 of the same type as receiver 40, mounted on the outer ring 37.

The roll control motor 48 is mounted on a central web of the ring 43, and, as shown in Fig. 6, is connected through gears in gear box 49 with a pinion 50 meshing with the internal segmental gear 51 attached to the outer ring 37. The roll control motor 48 is controlled as explained hereinafter to drive the pinion 50 over the segmental gear 51 so as to maintain the inner ring 43 horizontal even when the airplane rolls. The resultant movement adjusts the position of the rotor of the receiver 47 with respect to the stator. As the pitch and roll adjustments need only cover 20 to 30 degrees of arc, the movement of the inner ring 43 may be limited by suitable stops 52, Fig. 7.

The outer ring 37 and inner ring 43 form a gimbal mounting which permits the motors 41, 48 to maintain the web of the inner ring 43 as a "stable element" which is always horizontal.

The rollers 53, 53, Figs. 5 and 8, are mounted on bolts secured to ears formed on the lower surface of the inner ring 43. A large gear 54 rests upon the rollers 53, 53, and is centered by a shaft 55 journaled in the web of the ring 43. The shaft 55 is geared to the shaft 56′ controlling the wipers of a plurality of concentric potentiometers mounted inside the cover 56.

The azimuth control motor 57, Fig. 7, is mounted on the web of the stable element 43 and geared to a pinion 58 journaled in the stable element and meshing with the large gear 54, Fig. 5. The motor 57 thus can rotate the gear 54 through any desired azimuthal angle.

The antenna support 59, Figs. 4 and 8, is bolted to bosses 60, 60 formed in the web of the gear 54. The wave guide 5 is mounted through the reflector 6, which is pivotally attached at mid-point to the antenna support 59.

The tilt control motor 61, Fig. 4, is bolted to the web of the gear 54 and geared to a segmental gear 62 attached to a crank moving the adjustable rod 63. The rod 63 is pivotally attached to the reflector 6 at a point below the mid-point of the reflector 6. Operation of the motor 61 will tilt the reflector 6 about a horizontal axis.

Two gyroscopic devices of known type assist in the control of the antenna. The first device, of the artificial horizon type, has a vertically disposed gyroscopic element, and two transmitter elements, which may be arranged to indicate pitching of the airplane from normal on the head to tail axis of the airplane and rolling of the airplane on an axis at right angles to the head to tail axis. The transmitters are essentially small synchronous generators, having the rotors held by the gyroscopic element while the stators are moved by the airplane, and may be of the type known commercially as "telegons." The other gyroscopic device is like a gyroscopic compass and maintains an axis PX, Fig. 1, fixed in direction. The transmitter of this device indicates the angle of deviation, L, of the course, or head to tail axis, of the airplane with respect to this axis.

Each of the transmitters of these gyroscopic devices is associated with a control circuit, which may be as shown in Fig. 9. A source of voltage 70 excites the transmitter 71 associated with the gyroscopic device. When the support is displaced with respect to the rotating element of the gyroscope, a voltage is produced by the transmitter 71 which is connected to the receiver 72. This voltage is rectified and amplified by the control circuit 73, which may be of the type shown in Figs. 10 and 11, and operates the relay 74.

When the armature of relay 74 is operated upward, current from the power source 69 can flow in the windings of motor 75 turning the motor in one direction. When the armature of relay 74 is operated downward current can flow in the windings of motor 75 turning the motor in the other direction. The relay 74 is continually vibrated by current from the control circuit 73. The shaft of motor 75 is connected to the rotor of the receiver 72, and turns the receiver rotor until the voltage supplied to the control circuit 73 is reduced to zero and the relay 74 alternately supplies equal currents of opposite directions to the winding of motor 75, stopping motor 75. The receiver rotor 72 has thus been turned through the same angle as the transmitter rotor 71.

The pitch motor 41 and roll motor 48 both correspond to the motor 75 of Fig. 9 and the pitch receiver 40 and roll receiver 47 correspond to the receiver 72 of Fig. 9.

The voltage from the receiver 72 is supplied to transformer 76, Fig. 10, amplified by vacuum tube 77, and the amplified voltage supplied to the input circuit of vacuum tube 78. The anode circuit of vacuum tube 78 is supplied through resistor 82 by voltage from the source 79, Fig. 9, which also activates the transmitter.

Thus, alternating voltages from the source 70 are applied to both the grid and the anode circuits of the vacuum tube 78. The phase of the alternating voltage applied to the grid of vacuum tube 78 will depend upon the direction of the displacement of the transmitter 71.

If the alternating voltage applied to the grid of vacuum tube 78 is so phased as to make the grid negative when the alternating voltage through resistor 82 makes the anode positive, the anode current will be less than normal, and the voltage across resistor 80 will be less than normal. Similarly, if the alternating voltage applied to the grid of vacuum tube 78 is positive when the alternating voltage applied to the anode is positive, the anode current will be more than normal and the voltage across resistor 80 will be greater than normal.

The voltage source 79 and resistors 80 and 81 are adjusted so as to cause the direct current component of the voltage measured at the junction of 80 and 81 to be zero when the received alternating current signal is zero. Capacitor 83 is inserted to filter out the pulsations. The voltage developed across the source 79 and resistor 80 is applied through resistor 94 to the control element of vacuum tube 84. Voltage from the source 68 is also applied through resistor 67 to the control electrode of vacuum tube 84, to bias the control electrode to any desired value.

The vacuum tubes 84, 85, 86 are coupled by any suitable interstate networks, for example, interstage coupling networks of the type shown in U. S. Patent 1,751,527, March 25, 1930, H. Nyquist.

The voltages applied to the control grid of the vacuum tube 84 are amplified by the vacuum tubes 84, 85, 86.

The anode circuit of vacuum tube 86 is supplied with power from the source 66 through the coupling resistor 65.

The winding of relay 74, Fig. 9, is connected from the anode of vacuum tube 86 through a source of alternating current 88 and a source of voltage 87 to the cathode of vacuum tube 86.

The voltage of the source 87 is adjusted so that, for normal voltage applied to the control electrode of vacuum tube 84, the voltage across the source 66 and resistor 65 is balanced by the voltage of the source 87 and no direct current flows in the winding of relay 74. The alternating current from the source 88 in the winding of relay 74 causes the armatures to vibrate, producing equal pulses of positive and negative current in the winding of motor 75. The motor 75 is then at rest.

When the receiver is unbalanced the voltage applied by resistor 83 through resistor 94 to the control electrode of vacuum tube 84 is larger or smaller than normal, and the voltage applied to the control electrode of vacuum tube 86 is also larger or smaller than normal. The anode-cathode current in vacuum tube 86 is correspondingly changed, upsetting the balance between the voltage across source 66 and resistor 65 and the voltage of source 87, and causing a direct current to flow in the winding of relay 74. This direct current biases the relay 74 to produce longer pulses of one polarity than the pulses of the other polarity from the source 69, driving the motor 75 in the direction to rebalance the receiver 72.

The vacuum tube 84 may conveniently be a double triode, having a cathode common to both triodes, and a common cathode resistor 89. The lower anode is connected through source 90 to the cathode resistor 89 to stabilize the vacuum tube 84 against cathode fluctuations, by the method disclosed in an article "Sensitive D-C Amplifier with A-C Operation," by S. E. Miller published in Electronics, November 1941, page 27.

Resistors 91, 92 are connected across the output of vacuum tube 85, and the junction of these resistors is connected to the lower grid of vacuum tube 84. If a negative voltage is applied to the upper grid of vacuum tube 84, a positive voltage will be applied to the lower grid of vacuum tube 84. This negative voltage will reduce the current from source 90 flowing in resistor 89, making the cathode of tube 84 less positive with respect to the upper grid of vacuum tube 84, which is equivalent to making this grid less negative. Thus, the voltage fed back opposes the applied voltage and is a degenerative or negative feedback, which stabilizes the amplifier.

The capacitor 93 connected across the feedback path produces a voltage in the feedback path which varies with the derivative or time rate of change of the applied signal. This derivative is added to the signal voltage in vacuum tube 84 and assists, in the usual manner, in controlling relay 74 so that hunting of motor 75 is reduced.

Figure 2:
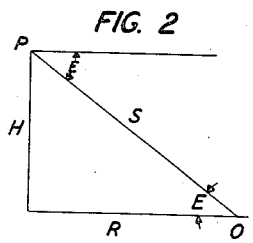
Fig. 2 shows the geometry relating to the tilt angle.

In order that the signal may be of maximum amplitude, the antenna should be tilted through the depression angle E, Fig. 2. In Fig. 2, S sin E—H=0. A potentiometer is mounted on the support 59, Fig. 4, and the wiper of this potentiometer is moved by the tilt motor 61. The winding of this potentiometer has a resistance varying per unit length approximately with a cosinusoidal function so that the voltage selected by the wiper is proportional to sin E. This potentiometer winding 100, Fig. 12, is connected across a suitable source of voltage 101. The voltage selected by the wiper of potentiometer 100 is supplied to the winding of a potentiometer 102. The wiper of potentiometer 102 is driven by motor 33, Fig. 3, proportionally to S to select a voltage proportional to S sin E. The winding of a potentiometer 103 is connected across a source of voltage 104. The wiper of potentiometer 103 is manually adjusted to select a voltage proportional to —H. The amplifier 105 may be of the type shown in Fig. 11. The voltage selected by the wiper of potentiometer 102, proportional to S sin E and the voltage selected by the wiper of potentiometer 103, proportional to —H are supplied to separate input resistors of amplifier 105, such as the resistors 94, 95, Fig. 11.

If the sum of the voltages supplied to the inputs of amplifier 105 is not equal to zero, relay 106 is operated to start motor 61 which moves the wiper of potentiometer 100 to make the sum of the input voltages equal zero, and, as shown in Fig. 4 to drive gear 62 and rod 63 tilting the antenna 6 through the required angle E.

The antenna should have a pattern of radiation which is highly directive in the horizontal plane so that the azimuthal position of the antenna will accurately determine the angle A, Fig. 1. The antenna, also, should automatically track, or face, the target, or point, O, even when the airplane turns from the course PC, and also as the airplane approaches the point O. As the angle A is measured from the course PC to the horizontal range PO, and the course PC changes with the heading of the airplane, the antenna may conveniently be controlled by the angle XPO, between the axis fixed in direction and the horizontal range. The angle XPO, designated N, evidently equals A−L. To obtain a rotation proportional to N, in Fig. 13, a source of voltage 110 is connected across the winding of a potentiometer 111, inside the container 56, Fig. 8, and having a wiper moved by the shaft 55 and associated gearing, to select a voltage proportional to −A.

A source of voltage 112 of opposite polarity to the source 110 is connected across the windings of the potentiometers 113, 114. The wiper of potentiometer 113 is moved by the servo-motor associated with the gyroscopic device maintaining the axis PX fixed in direction to select a voltage proportional to +L. The voltage selected by the wiper of potentiometer 114 is approximately proportional to +(A−L). The voltages selected by the wipers of potentiometers 111, 113, 114 are supplied to the amplifier 115, of the type shown in Fig. 11. The inputs are connected to the individual input resistors 94, 95, 96 of the amplifier, Fig. 11. The total input −A+L+(A−L) should equal zero. If the total input to the amplifier 115 is not equal to zero, relay 116 which is connected to the output of amplifier 115 will be operated to start motor 117, moving the wiper of potentiometer 114 until the total input is equal to zero, relay 116 is released and motor 117 is stopped. The wiper of potentiometer 114 will then have turned through an angle proportional to A−L or N. The wipers of other potentiometers may be arranged to also be driven by the shaft of motor 117.

In Fig. 14, a source of voltage 120 is connected to the winding of potentiometer 121. The wiper of potentiometer 121 is moved by motor 117, Fig. 13, to select a voltage proportional to A−L, that is, proportional to the angle N, Fig. 1, which is supplied to the summing amplifier 122, which may be of the type shown in Fig. 11. If desired, this voltage may be obtained by directly connecting the wiper of potentiometer 114, Fig. 13, to the input of amplifier 122.

A source of voltage 123 is connected across the winding of potentiometer 124. The voltage selected by the wiper of potentiometer 124 is supplied to the two variable resistors 125, 126 in serial relationship with the source of voltage 127. The sources of voltages 123 and 127 are of the same polarity, and the voltage of source 123 is double the voltage of source 127.

The wiper of potentiometer 124 is moved by the shaft 56′, Fig. 8, proportionally to the angle A, Fig. 1, between the vertical plane containing the target and the airplane, and the vertical plane through the course, or head to tail axis of the airplane. The angle A thus may be positive or negative. The voltage of source 123 is, say, 2V volts, and, assuming the zero value of A is the mid-point of the winding of potentiometer 124, the voltage selected by the wiper of potentiometer 124 will be V±A volts.

The countervoltage from the source 127 is V volts, thus the voltage drop in the resistors 125, 126 will be V±A−V, or ±A volts. The wiper of variable resistor 125 is moved by motor 28, Fig. 3, to insert a resistance proportional to R, the horizontal distance to the target. The wiper of the variable resistor 126 is adjusted to insert a resistance proportional to the "trail" T of the bomb to be used, as given in the tables for this bomb. The voltage across the resistor 126 and source 127 is supplied to the input of the summing amplifier 122.

The voltage drop proportional to A is thus applied across the resistances proportional to R+T, and the voltage drop across T is supplied to the amplifier. This fraction of the voltage drop is evidently $$\frac{T}{R+T}A$$

Thus the voltage supplied to the amplifier will be $$V \pm \frac{T}{R+T}A$$

As the bias voltage V is constant, it may be used as a comparison voltage in the amplifier, and thus need not be considered in the balance equation of the amplifier 122.

Voltage from the source 128, of opposite polarity to the voltages from the sources 120, 123 is applied across the winding of potentiometer 129. The wiper of potentiometer 129 is manually adjustable.

The voltages selected by the wipers of potentiometers 124, 125 and 129 are individually supplied to the input resistors 94, 95, 96 of the summing amplifier of Fig. 11.

The amplifier 122, which is of the type shown in Fig. 11, sums up the voltages from the wipers of potentiometers 121, 129 and resistor 125, and, if this sum is not zero, relay 130 is operated, starting the azimuth control motor 57 which moves the wiper of potentiometer 124 until the sum of the voltages is reduced to zero, releasing relay 130 and stopping motor 57. The azimuth control motor 57, shown in Fig. 7, rotates the antenna through the angle A.

The voltages supplied to the summing amplifier 122, will be a voltage proportional to N from the wiper of potentiometer 121, a voltage proportional to $$V+\frac{T}{R+T}A$$

from the wiper of resistor 125, and a balance voltage, which may be designated −(V+M) from the wiper of potentiometer 129. Thus, at the balance point where the sum of the input voltages is zero, $$N-\left(V+\frac{T}{R+T}A\right)-(V+M)=0$$

or $$\left(A-L\right)-\frac{T}{R+T}A-M=0$$

In Fig. 1, A is the angle OPC, L is the angle XPC, thus A−L is the angle OPX. Let the angle P₁PX be M, and angle OPP₁ be B. Evidently, (A−L)−B−M=0.

As the bomb falls in the head to tail axis of the airplane, the trail OP₁ is parallel to the course PC, thus angle FOP₁ equals A. Draw FP₁ perpendicular to PO produced, then $$OF=T\cos A,\ FP_1=T\sin A \text{ and } \tan B=\frac{T \sin A}{R+T \cos A}$$

For the small angles concerned tan B is approximately equal to B; and $$\frac{T \sin A}{R+T \cos A}$$

approximately equals $$\frac{T}{R+T}A$$

the errors in the two approximations being self-compensatory. Thus, for (A−L)−B−M=0, the approximate value $$(A-L)-\frac{T}{R+T}A-M=0$$

may be used.

As the airplane approaches the target area, the bombardier adjusts potentiometer 129, Fig. 14, causing motor 57 to turn the antenna until the return pulses shown on the cathode ray screen 11, Fig. 3, are a maximum. Now, if the airplane changes its course, the angle M will not change, but A—L will change in proportion to the angular change of course, thus unbalancing the output of amplifier 122, Fig. 14, and causing motor 57 to continuously turn the antenna to face the target.

As the airplane approaches the target, the angle A continuously increases. This increase produces a proportionate increase in the quantity $$\frac{T}{R+T}A$$

again unbalancing the amplifier 122, Fig. 14, and causing motor 57 to continuously turn the antenna to face the target.

What is claimed is:

1. An antenna support including a base, a first ring pivotally supported by said base, a first motor mounted on said base and geared to said first ring, a webbed ring pivotally and concentrically supported by said first ring, a second motor mounted on said webbed ring and geared to said first ring, said first and second motors being gyroscopically controlled to maintain said webbed ring horizontal, a plurality of rollers attached to said webbed ring, a shaft centrally journaled in said webbed ring, a gear supported by said rollers and attached to said shaft, a third motor mounted on said webbed ring and driving said gear, an antenna structure supported by said gear, and electrical computing means controlling said third motor to rotate said gear and antenna in azimuth about said shaft.

2. An antenna support including a base, a first ring pivotally supported by said base, a first motor mounted on said base and geared to said first ring, a webbed ring pivotally and concentrically supported by said first ring, a second motor mounted on said webbed ring and geared to said first ring, said first and second motors being gyroscopically controlled to maintain said webbed ring horizontal, a plurality of rollers attached to said webbed ring, a shaft centrally journaled in said webbed ring, a gear supported by said rollers and attached to said shaft, a third motor mounted on said webbed ring and driving said gear, an antenna support mounted on said gear, an antenna motor supported by said gear and geared to said antenna, and electrical computing means controlling said third motor to rotate said antenna in azimuth and said fourth motor to rotate said antenna in elevation.

3. Mechanism for directing to an object the antenna of a dirigible vehicle flying at constant height which includes a base gyroscopically controlled to remain horizontal, a support attached to said base, an antenna pivotally secured to said support, a first motor secured to said base and geared to said antenna, a radio system exciting said antenna, a second motor controlled by indications from said radio system to rotate proportionally to the slant distance from said vehicle to said object, a first voltage source of one polarity, a first potentiometer having a winding connected across said first source, and a first wiper manually adjusted to select a voltage proportional to the constant height of said vehicle, a second voltage source of opposite polarity, a second potentiometer having a winding connected across said second source and a second wiper moved by said first motor to select a voltage approximately proportional to the sine of the angle of depression from said vehicle to said target, a third potentiometer having a winding connected to said second wiper and a third wiper moved by said second motor proportionally to said slant distance, thermionic means for adding the voltages selected by said first and third wipers, and means connected to said thermionic means to control said first motor to move said second wiper to reduce the sum of said voltages to zero and to direct said antenna to face said object.

4. The method of tracking a device measuring the azimuth angle of a target with respect to an axis of a bomber airplane which comprises generating a voltage proportional to the magnitude of said azimuth angle multiplied by the ratio of the trail of the bomb to the horizontal range to said target plus the trail of the bomb, and controlling with said voltage the tracking of said device.

5. Mechanism for directing to a target the antenna of a bombing airplane, which includes a base gyroscopically controlled to remain horizontal, an antenna pivotally supported by said base, a first motor geared to said antenna, a radio system exciting said antenna, a second motor controlled by indications from said radio system to rotate proportionally to the horizontal distance from said airplane to said target, a source of a first voltage of one polarity gyroscopically controlled to be equal to the angle between an axis of said airplane and an axis fixed in direction, a second voltage source, a first potentiometer having a winding connected across said second source and a first wiper moved by said first motor, a first variable resistor having a winding connected to said first wiper and a second wiper moved by said second motor, a second variable resistor having a winding connected to said second wiper and a third wiper adjusted to make the resistance of said second resistor proportional to the trail of the bomb, a third voltage source of opposite polarity, a second potentiometer having a winding connected across said third source and a wiper manually adjusted to select a voltage proportional to the angle between said fixed axis and the track of said airplane, thermionic means for adding said first voltage, the voltage across said second resistor and said selected voltage, and means connected to said thermionic means to control said first motor to rotate said antenna and to adjust said first wiper to make the sum of said voltages zero.

6. The method of tracking a device measuring the azimuth angle of a target with respect to an axis of a bomber airplane which comprises establishing a direction fixed in space, generating a first voltage proportional to the angle between said fixed direction and the direction from the airplane to the target, generating a second voltage proportional to said azimuth angle multiplied by the ratio of the trail of the bomb to the sum of the horizontal range to the target and the trail, generating a third voltage, controlling the tracking of said device with all three of said voltages, and manually varying said third voltage to direct said device to said target.

DEAN E. WOOLDRIDGE.